(12) United States Patent
Bostick et al.

(10) Patent No.: US 9,817,570 B2
(45) Date of Patent: Nov. 14, 2017

(54) THREE DIMENSIONAL KEYBOARD WITH ROTATABLE KEYS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,061

(22) Filed: Nov. 17, 2015

(65) Prior Publication Data

US 2017/0139587 A1   May 18, 2017

(51) Int. Cl.
| | |
|---|---|
| *B41J 5/00* | (2006.01) |
| *G06F 3/0488* | (2013.01) |
| *G06F 3/0481* | (2013.01) |
| *G06F 3/01* | (2006.01) |
| *G06F 3/023* | (2006.01) |
| *G06F 3/02* | (2006.01) |

(52) U.S. Cl.
CPC .......... *G06F 3/04886* (2013.01); *G06F 3/016* (2013.01); *G06F 3/0202* (2013.01); *G06F 3/0233* (2013.01); *G06F 3/0238* (2013.01); *G06F 3/04815* (2013.01); *G06F 3/04883* (2013.01)

(58) Field of Classification Search
CPC ...................................... G06F 3/023
USPC ....................................... 400/477
See application file for complete search history.

(56) References Cited

U.S. PATENT DOCUMENTS

| | | | | |
|---|---|---|---|---|
| 3,506,795 A | * | 4/1970 | Schmidt | H01H 13/7006 200/16 A |
| 4,467,150 A | * | 8/1984 | Leitermann | H01H 13/70 200/292 |
| 6,940,490 B1 | * | 9/2005 | Kim | G06F 1/1626 341/21 |

(Continued)

FOREIGN PATENT DOCUMENTS

CN       102063245 A       5/2011

OTHER PUBLICATIONS

Ghosh et al., "Effective Virtual Keyboard Design With Size and Space Adaptation". Proceedings of the 2010 IEEE Students' Technology Symposium. IEEE, 2010, pp. 262-267.

*Primary Examiner* — Anthony Nguyen
(74) *Attorney, Agent, or Firm* — John R. Pivnichny; Law Office of Jim Boice

(57) ABSTRACT

A keyboard has a first row of keys, a second row of keys, and a third row of keys. Each key in the first row of keys has a first three-dimensional volumetric shape having a first height, a visible top face, and at least one visible side face; each key in the second row of keys has a second three-dimensional volumetric shape having a second height that is greater than the first height, a visible top face, and at least one visible side face; and each key in the third row of keys has a third three-dimensional volumetric shape having a third height that is greater than the second height, a visible top face, and at least one visible side face. The keyboard is electrically connected to a computing device for delivering user inputs from the keyboard to the computing device.

16 Claims, 5 Drawing Sheets

(56) References Cited

U.S. PATENT DOCUMENTS

| | | |
|---|---|---|
| 7,106,305 B2 | 9/2006 | Rosenberg |
| 7,182,533 B1* | 2/2007 | Caplan ................ G06F 1/1616 400/488 |
| 7,372,454 B2 | 5/2008 | Betts-LaCroix |
| 8,949,743 B2 | 2/2015 | Kida et al. |
| 8,959,013 B2 | 2/2015 | Galor et al. |
| 9,069,439 B2 | 6/2015 | Bawel |
| 9,069,455 B2 | 6/2015 | Sripada |
| 9,098,248 B2 | 8/2015 | Suzuki et al. |
| 2002/0130845 A1* | 9/2002 | Abe ..................... G06F 3/016 345/169 |
| 2004/0005183 A1* | 1/2004 | MacFarlane ............ B41J 5/10 400/472 |
| 2004/0090422 A1* | 5/2004 | Tsai ................... G06F 3/0219 345/168 |
| 2008/0075515 A1* | 3/2008 | Large ................. G06F 3/0216 400/472 |
| 2010/0093400 A1 | 4/2010 | Ju et al. |
| 2011/0038114 A1* | 2/2011 | Pance ................. G06F 1/1616 361/679.4 |
| 2011/0078567 A1 | 3/2011 | Kim et al. |
| 2012/0062465 A1* | 3/2012 | Spetalnick ........... G06F 3/0236 345/168 |
| 2012/0113008 A1* | 5/2012 | Makinen ............... G06F 3/016 345/168 |
| 2012/0242659 A1 | 9/2012 | Sun |
| 2013/0009896 A1 | 1/2013 | Zaliva |
| 2013/0106831 A1* | 5/2013 | Lee ..................... G06T 19/20 345/419 |
| 2014/0040810 A1 | 2/2014 | Haliburton et al. |
| 2014/0132519 A1 | 5/2014 | Chun |
| 2014/0160063 A1* | 6/2014 | Yairi ................... G06F 3/044 345/174 |
| 2015/0091804 A1 | 4/2015 | Ito |

* cited by examiner

THREE DIMENSIONAL KEYBOARD WITH ROTATABLE KEYS

BACKGROUND

The present disclosure relates to the field of computers, and specifically to keyboards used to provide inputs to computers. Still more specifically, the present invention relates to a keyboard that has multifunctional rotating keys.

SUMMARY

In an embodiment of the present invention, a keyboard has a first row of keys, a second row of keys, and a third row of keys. Each key in the first row of keys has a first three-dimensional volumetric shape having a first height, a visible top face, and at least one visible side face; each key in the second row of keys has a second three-dimensional volumetric shape having a second height that is greater than the first height, a visible top face, and at least one visible side face; and each key in the third row of keys has a third three-dimensional volumetric shape having a third height that is greater than the second height, a visible top face, and at least one visible side face. The keyboard further comprises an electrical connection between the keyboard and a computing device for delivering user inputs from the keyboard to the computing device.

In an embodiment of the present invention, a computing device has a keyboard. The keyboard has a first row of keys, a second row of keys, and a third row of keys. Each key in the first row of keys has a first three-dimensional volumetric shape having a first height, a visible top face, and at least one visible side face; each key in the second row of keys has a second three-dimensional volumetric shape having a second height that is greater than the first height, a visible top face, and at least one visible side face; and each key in the third row of keys has a third three-dimensional volumetric shape having a third height that is greater than the second height, a visible top face, and at least one visible side face. The keyboard further comprises an electrical connection between the keyboard and a computing device for delivering user inputs from the keyboard to the computing device.

In an embodiment of the present invention, a processor-implemented method generates a virtual three-dimensional keyboard. One or more processors generate a first row of virtual keys on a display, where each virtual key in the first row of virtual keys has a first three-dimensional volumetric shape having a first height, a visible top face, and at least one visible side face. The processor(s) generate a second row of virtual keys on the display, where each virtual key in the second row of virtual keys has a second three-dimensional volumetric shape having a second height that is greater than the first height, a visible top face, and at least one visible side face. The processor(s) generate a third row of virtual keys, where each virtual key in the third row of virtual keys has a third three-dimensional volumetric shape having a third height that is greater than the second height, a visible top face, and at least one visible side face. The virtual three-dimensional keyboard is displayed on a touch-screen display that displays the first row of keys, the second row of keys, and the third row of keys. The touch-screen is capable of receiving the user inputs. Each key from the first, second and third rows is rotatable to present and enable different input functionalities for each key from the first, second and third rows. A set of haptic generators generates tactile feedbacks that are unique for an input function of each key from the first, second and third rows.

DETAILED DESCRIPTION

Figure 1:
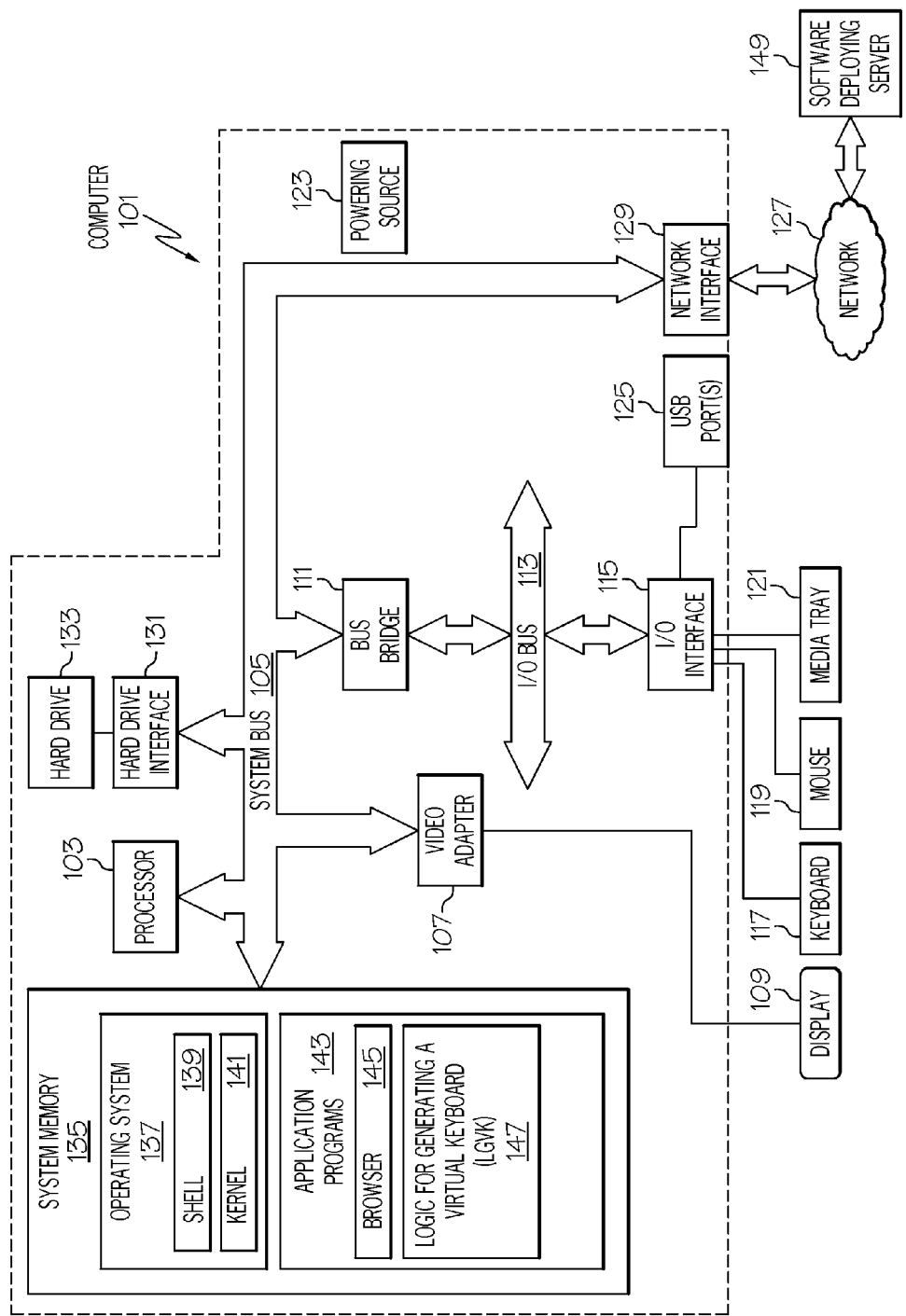
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, and/or a media tray 121 (which may include storage devices such as CD-ROM drives, multi-media interfaces, etc.).

While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129 to a network 127. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc. Network 127 may connect computer 101 to a software deploying server 149 and/or other systems/devices.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Generating a Virtual Keyboard (LGVK) 147. LGVK 147 includes code for implementing the processes described below, including those described in FIGS. 2-5. In one or more embodiments, software deploying server 149 deploys LGVK 147 to computer 101 on an as-needed basis.

Also within computer 101 is a power source 123. When plugged into a nearly unlimited power supply (e.g., a power grid from a power company), the power source 123 is the system of outlets, wires, transformers that support the power grid. However, when part of a mobile computing device, power source 123 is a battery.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Presented herein is a novel keyboard for receiving user inputs to a computing device. In one embodiment, the keyboard is a physical keyboard having fixed dimensions and structure. In another embodiment, the keyboard is a virtual keyboard that is created by a computer. In one embodiment, the virtual keyboard is purely a visual representation on a display. In another embodiment, the virtual keyboard is a combination of a visual representation on the display as well as a dynamically generated physical device that is created by microfluidics as described herein.

As described herein, a physical, semi-virtual, or virtual keyboard presents keys that each have a three-dimensional volume with faces, including a visible top face and one or more visible side faces. The three-dimensional volume may be any three-dimensional volumetric shape in various embodiments, including but not limited to a cylinder (that has a height dimension and a circular or oval cross-section); a cuboid (that has height, length, and width dimensions, all of which meet at right angles to one another, and where at least one dimension is different in length from another); a prism (i.e., a volume that has a height dimension and a polygon cross-section, such as a pentagon, hexagon, heptagon, etc.); a polyhedron (i.e., a three-dimensional solid figure in which each side is a flat surface); etc.

Figure 2:
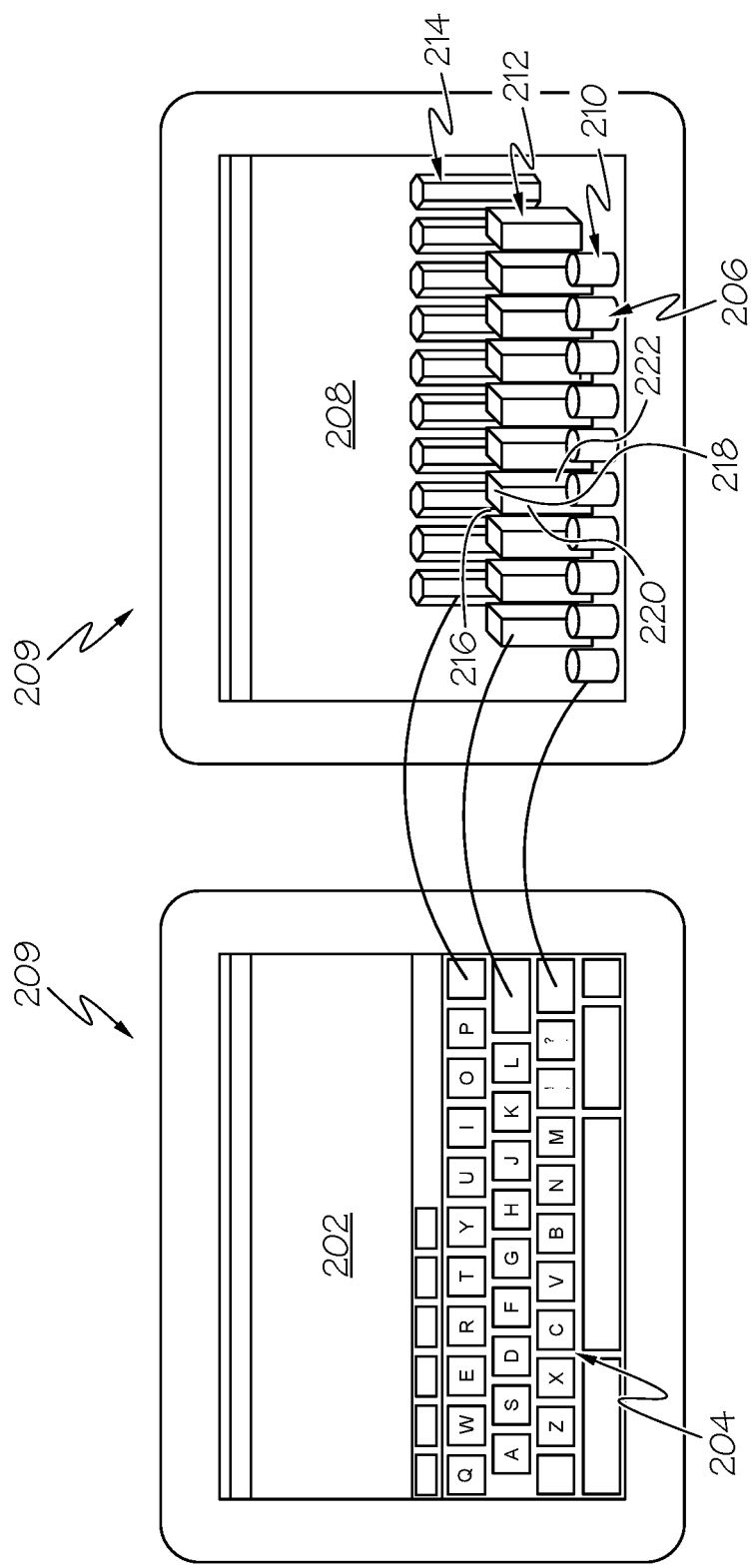
FIG. 2 illustrates a virtual three-dimensional keyboard in accordance with one or more embodiments of the present invention.

With reference now to FIG. 2, a display 209 used in one or more embodiments of the present invention is presented. Display 209, analogous to display 109 shown in FIG. 1, is preferably a touch screen display, which is capable of displaying a graphical user interface as well as receiving touch inputs from a user (e.g., through the use of a grid of touch sensitive regions on the display 209). As depicted in graphical user interface (GUI) 202, initially a virtual keyboard 204 (which allows a user to type in characters, commands, etc. using the touch-screen capability of the display 209 that recognizes a user's touch of one or more of the virtual keys depicted in the virtual keyboard 204) is two-dimensional, such that each virtual key on the virtual keyboard 204 appears to be in a same plane. However, the present invention transforms the features of the two-dimensional virtual keyboard 204 into a three-dimensional virtual keyboard 206, as depicted in GUI 208.

As shown in GUI 208, the three-dimensional virtual keyboard 206 has a first row 210 of virtual keys, a second row 212 of virtual keys, and a third row 214 of virtual keys, each of which respond to a touch by a user (using the touch-screen capabilities of display 209) as an input to call on the function of the particular virtual key (e.g., inputting a particular letter, spacing, control function, etc.). However, as shown in GUI 208, the virtual keys in the first row 210 are shorter than the virtual keys in the second row 212, which are shorter than the virtual keys in the third row 214. This provides several novel features to the virtual keyboard.

First, the different heights of the virtual keys in the various rows allow the user to see not just the top of the virtual keys (as in GUI 202), but also one or more sides of the virtual keys. This allows the system to offer alternative functions for each key, depending on which facet is used.

For example, consider virtual key 216. A top facet 218 of virtual key 216 may be for a particular letter, such that touching the top of that virtual key causes the system to receive an input of that particular letter. However, assume now that virtual key 216 shows a different input (e.g., another letter, a computer command such as "Print", etc.) on a front facet 220 of the virtual key 216, and another input on a side facet 222 of the virtual key 216. Thus, by touching the front facet 220 or the side facet 222, the user will input a different character/command/etc. than the letter represented by the top facet 218. Alternatively, selecting a particular facet (from facets 218, 220, 222) can be controlled by a separate button, control button, physical orientation of the display (209), etc. For example, if the physical display is held upright (as depicted in FIG. 2 and detected by accelerometers and/or other 3-D orientation sensors—not shown), then touching the virtual key 216 will result in the input of whatever character/command/etc. is depicted on top facet 218. However, if the physical display is laid down (such that the top of the display 209 is oriented away from the user), then touching the virtual key 216 will result in the input of whatever character/command/etc. is depicted on front facet 220. Similarly, if the physical display is rotated from right to left (such that the right side of the display 209 is towards the user), then touching the virtual key 216 will result in the input of whatever character/command/etc. is depicted on side facet 222.

As depicted in FIG. 2, the virtual keys in GUI 208 are depicted as having three-dimensional volumetric shapes. In one embodiment, all of the rows (210, 212, 214) use the same type of three-dimensional volumetric shape, although having different heights for the different rows. In another embodiment, however, each row uses a unique shape to depict the keys in that row. For example, the first row 210 may show the virtual keys as cylinders, the second row 212 may show the virtual keys as cuboids, and the third row 214 may show the virtual keys as prisms. This allows the user to recognize that each row is unique, and/or may be devoted to certain types of inputs/commands.

Figure 3:
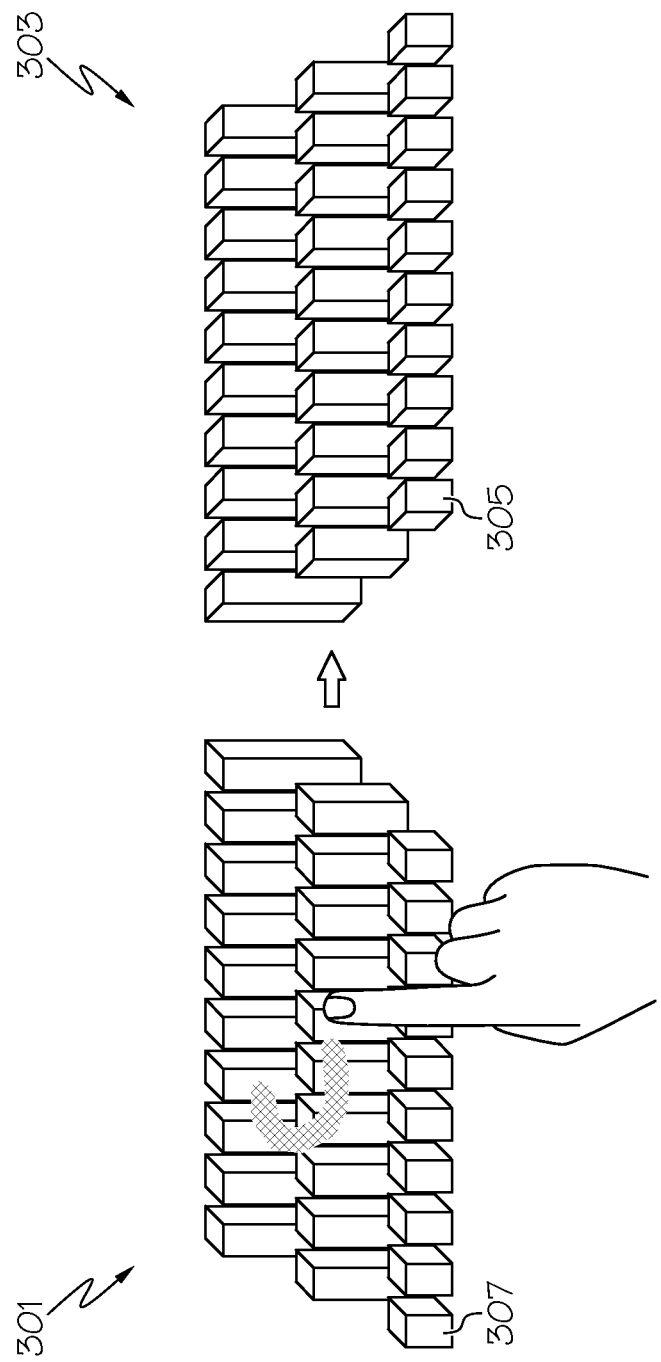
FIG. 3 depicts a virtual three-dimensional keyboard having rotatable keys in accordance with one or more embodiments of the present invention.
Figure 4:
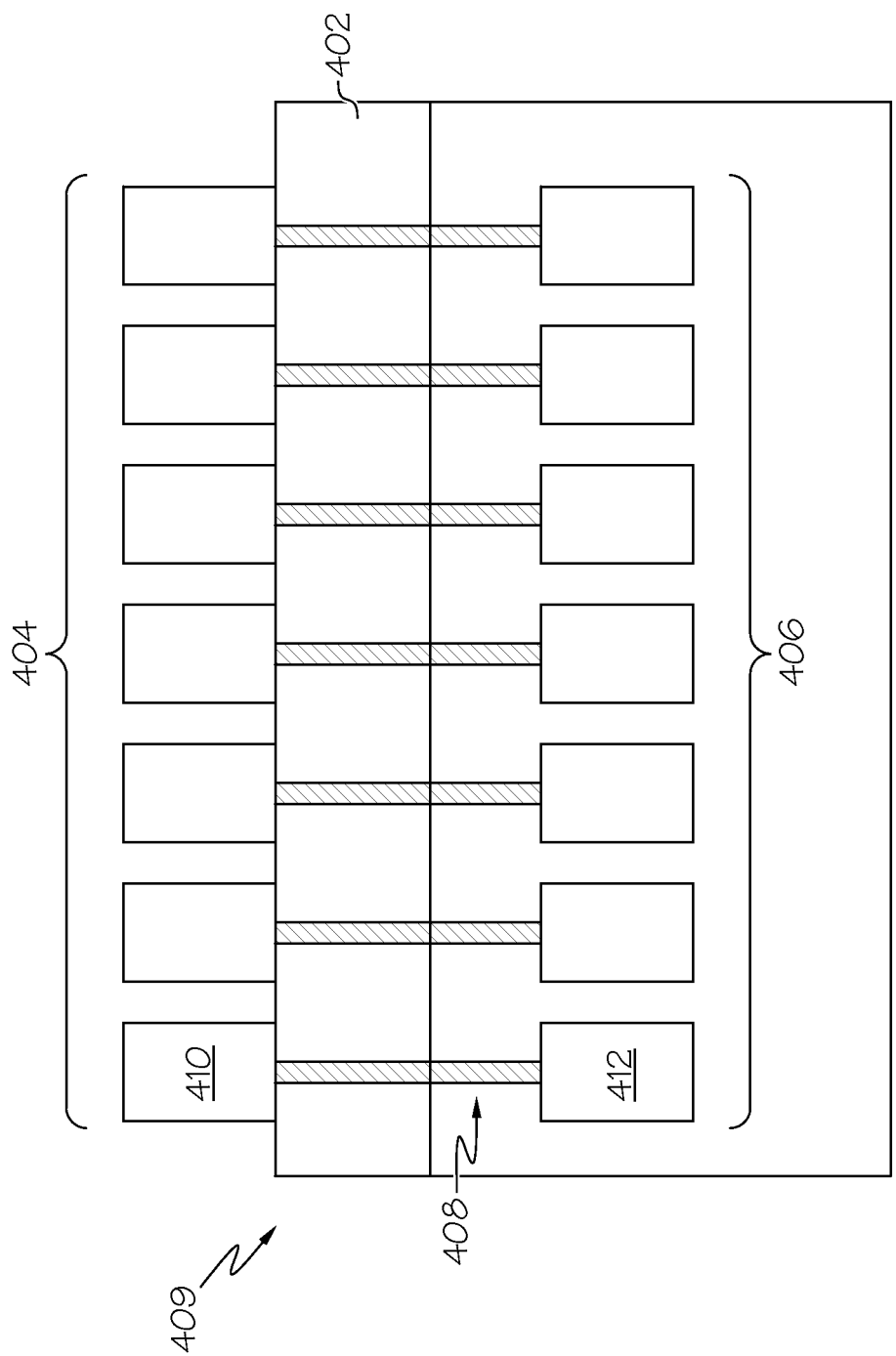
FIG. 4 illustrates a microfluidics layer and haptic generators in a keyboard in accordance with one or more embodiments of the present invention.

As depicted in FIG. 3, the orientation of the virtual three-dimensional keyboard 301 allows the user to "see" the top, front, and first side/facet of the virtual keys. However, by performing a finger gesture or other input command to rotate the virtual three-dimensional keyboard 301, virtual three-dimensional keyboard 303 appears on the display, allowing the user to still see the top and front sides/facets of the virtual keys, but now the user sees the second sides/facets (e.g., side facet 305) rather than the first sides/facets (e.g., side facet 307), such that the user can input whatever character/command is depicted on the now visible second side/facet.

In one embodiment of the present invention, rotating the virtual keys causes the keyboard to switch from a first language (e.g., English) to a second language (e.g., Greek), such that characters on the virtual keys change.

In one embodiment of the present invention, the three-dimensional keyboard actually occupies physical space by being extended away from the display. For example, consider the semi-virtual display 409 depicted in FIG. 4. A microfluidics layer 402 holds fluids that can be selectively pushed (e.g., using micro-pumps—not shown) into various regions of the semi-virtual display 409, thus causing keys 404 to extend from the top of the semi-virtual display 409. That is, a malleable film on the top of the semi-virtual display 409 is deformed to create a physical three-dimensional set of keys 404. Once physically formed, controllable pixels display information on the tops and/or sides of the keys 404 such as particular characters, commands, etc. (similarly to that described in FIG. 2).

In an embodiment of the present invention, the keyboard (physical, virtual as in FIG. 2, semi-virtual as in FIG. 4) include haptic (i.e., tactile) feedback from haptic generators 406. Haptic generators 406 produce specific mechanical vibrations for particular keys or sets of keys using a mechanical vibrator, whose energy is transmitted to the keys directly or via connectors 408. For example, assume that key 410 is used to input the character "A". Haptic generator 406 generates a particular vibration pattern (e.g., using Morse code, etc.) that lets the user know the he/she is inputting the letter "A" when he/she touches and/or depresses key 410.

In another embodiment of the present invention, the haptic feedback provides the user with a tactile indication of the rotational position (see FIG. 3) of the virtual keys on the virtual and/or semi-virtual keyboards described herein.

Figure 5:
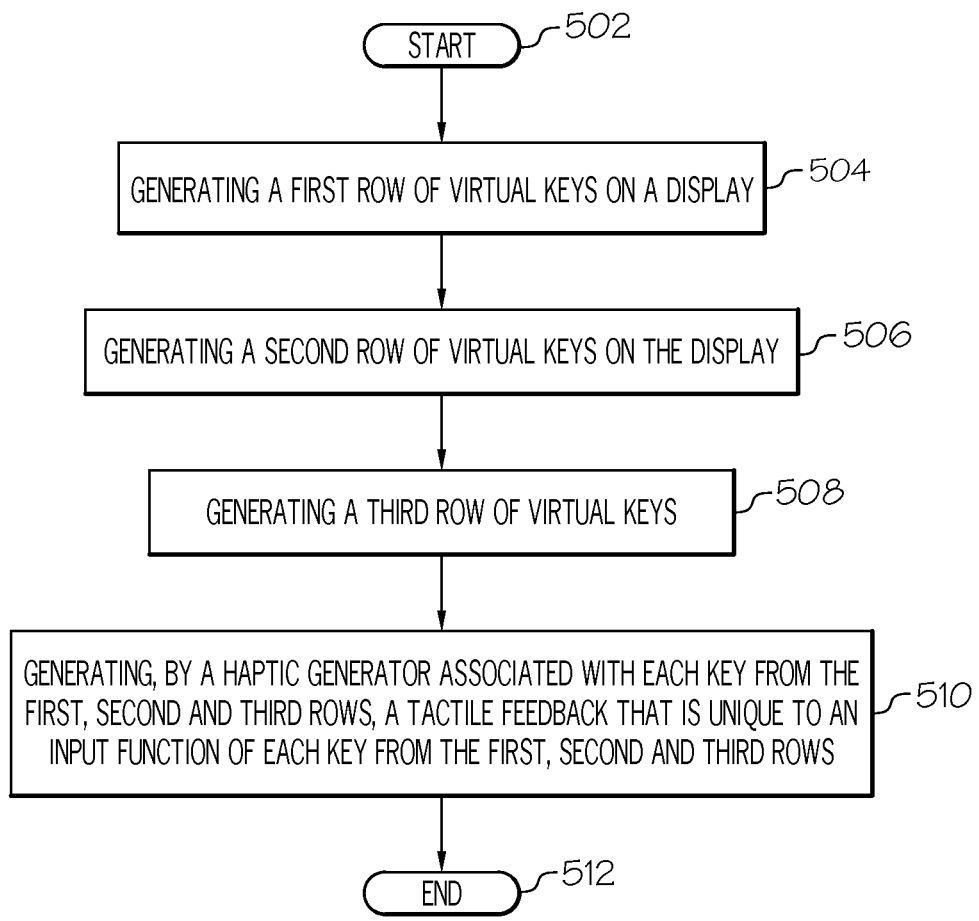
FIG. 5 is a high-level flow chart of one or more steps performed by one or more processors and/or other hardware to create a virtual three-dimensional keyboard.

With reference now to FIG. 5, a high-level flow chart of one or more steps performed by one or more processors and/or other hardware devices to generate a virtual three-dimensional keyboard (e.g., see FIG. 2) is presented.

After initiator block 502, one or more processors (e.g., processor 103 in FIG. 1) generate a first row of virtual keys on a display (e.g., first row 210 on GUI 208 in FIG. 2). Each virtual key in the first row of virtual keys has a first three-dimensional volumetric shape having a first height, a visible top face (e.g., top facet 218), and at least one visible side face (e.g., from facet 220 and/or side facet 222), as described in block 504.

As described in block 506, the processor(s) generate a second row of virtual keys on the display (e.g., second row 212 in FIG. 2). As shown in FIG. 2, each virtual key in the second row of virtual keys has a second three-dimensional volumetric shape having a second height that is greater than the first height, a visible top face, and at least one visible side face. That is, the keys in the second row 212 are taller than the keys in the first row 210.

As described in block 508, the processor(s) generate a third row of virtual keys (e.g., third row 214 in FIG. 2). Each virtual key in the third row of virtual keys has a third three-dimensional volumetric shape having a third height that is greater than the second height, a visible top face, and at least one visible side face. That is, the third row is taller than the second row, which is taller than the first row. As described herein and in one embodiment of the present invention, the virtual three-dimensional keyboard is displayed on a touch-screen display, which is capable of receiving user inputs. As also described herein, each key from the first, second and third rows is rotatable to present and enable different input functionalities for each key from the first, second and third rows.

As described in block 510, a set of haptic generators (e.g., the set of haptic generators 406 shown in FIG. 4) associated with each key from the first, second and third rows generates tactile feedbacks that are unique for an input function of each key from the first, second and third rows. That is, the haptic generators may generate a particular vibration that indicates which way the sets of keys are virtually rotated (see FIG. 3), the particular input that will occur when a key is touched on the touch screen, which row is being touched (e.g., if a particular row is devoted to a particular type of function, such as formatting, inputting control commands to a process system, etc.).

For example, assume that the virtual keyboard is used to control certain actuators, pumps, etc. in a refinery. Assume further that the top row of virtual keys, when rotated in a first direction, are specifically for controlling pumps in a first processing unit in the refinery. Assume further that the same top row of virtual keys, when rotated in a second direction, are now specifically for controlling pumps in a second processing unit in the refinery. Thus, when the user touches the top row of virtual keys, a different type of tactile/haptic feedback will be produced by the haptic generators, letting the user know which processing unit he/she is controlling the pumps in.

The flow-chart ends at terminator block 512.

Thus, disclosed herein and in one or more embodiments, a method and/or system allows a user to visualize and interact with virtual three-dimensional (3D) keyboard keys on a touch interface device. The keys of the keyboard may be shown as 3D bars (i.e., cuboids). Each key row of the keyboard has a different height, so that each key row can be visible clearly and allow for contents (letters, words, numbers, symbols, of different languages, etc.) to be displayed on 3D key top, and two sides.

Each 3D key includes haptic feedback (i.e., vibration, pulsing, etc.) when making contact within defined tolerance. The haptic feedback can also be mapped to specific keys and languages in the rotation position of the 3D keys. The haptic feedback lets the user feel the keyboard to enhance the visualization of the 3D keys.

The present invention provides the ability for a user to perform a finger gesture to visually rotate the 3D keys on touch interface or optical interface, thus selecting additional contents (e.g., text, number, symbols, icons, etc.) from the multi sided 3D keys displayed without the need to change the keyboard type.

The position of the 3D key rotation can be mapped to a specific language, thus allowing the user to type different languages on the fly without the need to switch out the entire keyboard. For example, the first position of the virtual keys may be in English, the second position or rotation may be in Spanish (which utilizes different diacritical marks than those used in English), etc.

Furthermore, the present invention can be applied to various device types having a touch or optical interface, such as a smart phone, a tablet computer, a Point of Sale system, a kiosk, a smart television, a computer that uses images captured by a camera to detect user inputs, etc.

The present invention overcomes several problems in the prior art. For example, with existing systems (traditional or mobile), the keyboard is often a physical or touch 2D keyboard. The keys have a flat surface and are marked with a letter and/or some function (typically activated in combination with another key). However, such keyboards have problems and/or limitations.

For example, 2D keys limit the number of visual key combinations that the user can see on a key. Furthermore, it is cumbersome to change languages for a keyboard (which requires going into a settings page, toggling back and forth to a window that displays the virtual keyboard, etc.).

Furthermore, there are scenarios where the user wants to change the keyboard language for a specific key or word without changing the entire keyboard. For example, the user may want to type a complex password (having a capital letter, a lower case letter, a special character, and letter from another language), and would want all such letters to be a same keyboard.

Furthermore, some commands use key combinations such as Shift and a character key (e.g., the "5" key becomes the "%" key).

In one embodiment, the multi-sided 3D keys are used for different functions within games or as part of game.

In one or more embodiments of the present invention, software is implemented within the device operating system as an extension, thus making visualization of 3D key and rotation functions available to applications via an application programming interface (API). This allows a user to define mapping 3D key contents; to define mapping of 3D key contents positions; to change things such as language based on rotation position of key; to define haptic feedback; to perform/define a finger gesture to visually rotate 3D key; and/or to press the 3D key.

In one or more embodiments of the present invention, the system is preconfigured by defining various features. That is, key mapping is defined by the user, thus defining contents (letters, words, numbers, symbols, icons, etc.) to be displayed on the 3D keys. The 3D key position for rotation is defined such that a user-defined sequence determines what is displayed when rotated, as well as the contents/function for any given 3D key.

Haptic feedback is also initially defined, thus allowing the user to identify particular features of certain keys and/or rows of keys. The haptic feedback can also be mapped to specific keys and languages in the rotation of the 3D keys. The user can define whether or not haptic feedback is enabled/disabled, and determine the strength level of the haptic feedback.

The preconfiguration also includes visualizing the 3D keyboard, such that keys of the keyboard will be shown as certain 3D shape(s). Each key row of the keyboard has a different height, so that each key row can be visible clearly and allow for (content letters, words, numbers, symbols, etc.) displayed on top, and two sides of 3D key. This difference in row height allows the user to more easily see the keys, as well as their sides.

The user can press each of the visible sides of the keys (top, 2 sides), thus resulting not only in a particular input, but also a particular haptic feedback type (i.e., vibration, pulsing, etc.) defined for the pressed side of the key. The haptic feedback can also be mapped to specific keys and languages in the rotation of the 3D keys.

In one or more embodiments of the present invention, the user can perform a finger gesture (as shown in FIG. 3) or input a combination of keys (e.g., a particular key with a "Control" or other key) to visually rotate the 3D keys on the keyboard, thus allowing the user to view additional letters, numbers, symbols, etc. on the virtual 3D keys.

Depending on how the user has defined the keys, the 3D key can have 1-n sides defined.

The language of the keys can be defined by the position of rotation. For example, a primary language (e.g., English) is defined for the first position displayed, and a second position of rotation is defined for a second language (e.g., Spanish), etc.

While selecting any letter/symbols, in one or more embodiments the user has to touch at the appropriate place of the 3D key on the keyboard. For example, touching the top facet 218 in FIG. 2 will cause an input of a first character/function, toughing the front facet 220 will cause the input of a second character/function, etc.

As described herein, the present invention may be applied in various embodiments to a virtual 3D keyboard displayed on a touch device, a semi-virtual keyboard generated on a touch screen with use of microfluidics, thus producing raised keys, and a static physical keyboards (in which each row of keys is at a different height, such that the back row is taller than the middle row, which is taller than the bottom row.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A keyboard comprising:
 a microfluidics layer on a display, wherein the microfluidics layer is selectively manipulated to generate a three-dimensional volumetric shape of keys on the keyboard, and wherein the keyboard comprises:
  a first row of keys, wherein each key in the first row of keys has a first three-dimensional volumetric shape having a first height, a visible top face, and at least one visible side face;
  a second row of keys, wherein each key in the second row of keys has a second three-dimensional volumetric shape having a second height that is greater than the first height, a visible top face, and at least one visible side face, wherein the first height of the first row of keys being shorter than the second height of the second row of keys allows a view of multiple sides of the second row of keys to be unobstructed by the first row of keys;

a third row of keys, wherein each key in the third row of keys has a third three-dimensional volumetric shape having a third height that is greater than the second height, a visible top face, and at least one visible side face, wherein the second height of the second row of keys being shorter than the third height of the third row of keys allows a view of multiple sides of the third row of keys to be unobstructed by the second row of keys; and an electrical connection between the keyboard and a computing device for delivering user inputs from the keyboard to the computing device.

2. The keyboard of claim 1, wherein each key from the first, second and third rows is rotatable to present and enable different input functionalities for each key from the first, second and third rows.

3. The keyboard of claim 1, wherein each key from the first, second and third rows is rotatable to switch the keyboard from a first language to a second language.

4. The keyboard of claim 1, wherein the visible top face of each key from the first, second and third rows depicts a unique input function for each key from the first, second and third rows.

5. The keyboard of claim 1, wherein the first three-dimensional volumetric shape, the second three-dimensional volumetric shape, and the third three-dimensional volumetric shape are a same three-dimensional volumetric shape, and wherein the same three-dimensional volumetric shape is from a group consisting of a cylinder, a cuboid, and a prism.

6. The keyboard of claim 1, wherein the first three-dimensional volumetric shape is a cylinder that has the first height and a circular cross-section, the second three-dimensional volumetric shape is a cuboid that has the second height, a length dimension, and a width dimension, wherein the length dimension and the width dimension meet at right angles to one another, and the third three-dimensional volumetric shape is a prism that has the third height and a polygon cross-section.

7. The keyboard of claim 1, further comprising:
a set of haptic generators associated with the keys from the first, second and third rows, wherein the set of haptic generators generates tactile feedbacks that are unique for an input function of each key from the first, second and third rows, and wherein the tactile feedbacks are vibration patterns.

8. A computing device comprising:
a processor;
a display; and
a keyboard, wherein the keyboard comprises:
a first row of keys, wherein each key in the first row of keys has a first three-dimensional volumetric shape having a first height, a visible top face, and at least one visible side face, and wherein the first three-dimensional volumetric shape is a cylinder;
a second row of keys, wherein each key in the second row of keys has a second three-dimensional volumetric shape having a second height that is greater than the first height, a visible top face, and at least one visible side face, and wherein the second three-dimensional volumetric shape is a cuboid;
a third row of keys, wherein each key in the third row of keys has a third three-dimensional volumetric shape having a third height that is greater than the second height, a visible top face, and at least one visible side face, wherein the third three-dimensional volumetric shape is a prism; and an electrical connection between the keyboard and the processor for delivering user inputs from the keyboard to the processor.

9. The computing device of claim 8, wherein the keyboard is a semi-virtual keyboard that is actualized on a display having a microfluidics layer, wherein the microfluidics layer is selectively manipulated to generate the first row of keys, the second row of keys, and the third row of keys, and wherein the display receives the user inputs.

10. The computing device of claim 8, wherein the keyboard is a virtual keyboard that is displayed on a touch-screen display, wherein the touch-screen display depicts the first row of keys, the second row of keys, and the third row of keys, wherein the touch-screen receives the user inputs, wherein different facets on keys on the keyboard provide different inputs, and wherein a facet to be used on the keys is selected by the computing device according to a physical positioning of the keyboard in physical three-dimensional space.

11. The computing device of claim 8, wherein each key from the first, second and third rows is rotatable to present and enable different input functionalities for each key from the first, second and third rows.

12. The computing device of claim 8, wherein the visible top face of each key from the first, second and third rows depicts a unique input function for each key from the first, second and third rows.

13. The computing device of claim 8, further comprising:
a set of haptic generators associated with keys from the first, second and third rows, wherein the set of haptic generators generates tactile feedbacks that are unique for an input function of each key from the first, second and third rows.

14. A processor-implemented method of generating a virtual three-dimensional keyboard, the processor-implemented method comprising:
generating, by one or more processors manipulating a microfluidics layer on a display, a first row of physical keys that physically emerge from a display, wherein each physical key in the first row of virtual keys has a first three-dimensional volumetric shape having a first height, a visible top face, and at least one visible side face;
generating, by one or more processors manipulating the microfluidics layer on the display, a second row of physical keys that physically emerge from the display, wherein each physical key in the second row of virtual keys has a second three-dimensional volumetric shape having a second height that is greater than the first height, a visible top face, and at least one visible side face;
generating, by one or more processors manipulating the microfluidics layer on the display, a third row of physical keys that physically emerge from the display, wherein each virtual key in the third row of physical keys has a third three-dimensional volumetric shape having a third height that is greater than the second height, a visible top face, and at least one visible side face, wherein the virtual three-dimensional keyboard is displayed on the display that displays the first row of keys, the second row of keys, and the third row of keys, wherein the display is capable of receiving the user inputs, and wherein each key from the first, second and third rows is rotatable to present and enable different input functionalities for each key from the first, second and third rows; and generating, by a set of haptic generators associated with each key from the first, second and third rows, tactile feedbacks that are unique for an input function of each key from the first, second and third rows.

15. The computing device of claim 8, wherein the keyboard is a virtual keyboard that is displayed on a touchscreen display, and wherein the computing device further comprises:

a set of haptic generators associated with keys from the virtual keyboard, wherein the set of haptic generators generates tactile feedbacks that indicate a rotational position of the virtual keys on the virtual keyboard.

16. The computing device of claim 8, wherein the keyboard is a virtual keyboard that is displayed on a touchscreen display, and wherein the computing device further comprises:

associating a particular row of keys from the virtual keyboard with controls for a first set of equipment in a first physical location when the first row of keys are rotated in a first direction; and associating the particular row of keys from the virtual keyboard with controls for a second set of equipment in a second physical location when the first row of keys are rotated in a second direction that is different from the first direction; and selectively controlling the first set of equipment and the second set of equipment by the particular row of keys based on a direction in which the particular row of keys is rotated.

* * * * *